United States Patent
Bisaria et al.

(10) Patent No.: US 11,553,502 B2
(45) Date of Patent: Jan. 10, 2023

(54) RECALIBRATING RESOURCE PROFILES FOR NETWORK SLICES IN A 5G OR OTHER NEXT GENERATION WIRELESS NETWORK

(71) Applicant: AT&T Intellectual Property I, L.P., Atlanta, GA (US)

(72) Inventors: Rakesh Bisaria, Freehold, NJ (US); Shen-Neng Chiou, Holmdel, NJ (US); Rakesh Shankar Mhapsekar, Middletown, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 85 days.

(21) Appl. No.: 16/804,392

(22) Filed: Feb. 28, 2020

(65) Prior Publication Data
US 2021/0274512 A1  Sep. 2, 2021

(51) Int. Cl.
*H04W 72/08* (2009.01)
*H04W 28/08* (2009.01)
(Continued)

(52) U.S. Cl.
CPC ......... *H04W 72/085* (2013.01); *H04W 24/08* (2013.01); *H04W 28/08* (2013.01); *H04W 72/10* (2013.01)

(58) Field of Classification Search
CPC ... H04W 72/085; H04W 72/10; H04W 24/08; H04W 28/08; H04W 24/02; H04L 47/76;
(Continued)

(56) References Cited

U.S. PATENT DOCUMENTS

2017/0164349 A1* 6/2017 Zhu .................. H04W 76/10
2018/0220276 A1* 8/2018 Senarath ............ H04L 12/1403
(Continued)

OTHER PUBLICATIONS

IEEE: Framework for Generic Design of Massive IoT Slice in 5G; S. Sree Lekshmi, M.S. Anjana2, Bhavana B. Nair, Dhanesh Raj, and Seshaiah Ponnekanti, (Year: 2019).*
(Continued)

*Primary Examiner* — Mohammed S Chowdhury
(74) *Attorney, Agent, or Firm* — Amin, Turocy & Watson, LLP

(57) ABSTRACT

The technologies described herein are generally directed to facilitating the allocation, scheduling, and management of network slice resources. According some embodiments, a system can facilitate performance of operations. The operations can include, based on a request for a network service type that was received from a user device, allocating a network slice of a network to the user device, with the network slice being previously assigned a capacity of a resource of the network in accordance with a resource profile. Further, operations include monitoring performance of the network slice, resulting in monitored slice performance compared to a performance requirement of the network service type. Another operation includes, based on the monitored slice performance, facilitating recalibration of the resource profile in accordance with a condition associated with the network service type, resulting in a modification of the capacity of the resource assigned to the network slice.

20 Claims, 10 Drawing Sheets

(51) Int. Cl.
*H04W 72/10* (2009.01)
*H04W 24/08* (2009.01)

(58) Field of Classification Search
CPC ..... H04L 47/125; H04L 47/80; H04L 47/805; H04L 47/823
See application file for complete search history.

(56) References Cited

U.S. PATENT DOCUMENTS

| | | | |
|---|---|---|---|
| 2018/0242304 A1* | 8/2018 | Rong | H04W 72/048 |
| 2018/0270073 A1* | 9/2018 | Senarath | H04M 15/46 |
| 2018/0359337 A1* | 12/2018 | Kodaypak | H04L 43/08 |
| 2019/0281494 A1* | 9/2019 | Chan | H04W 24/08 |
| 2020/0053546 A1* | 2/2020 | Panchal | H04L 45/306 |
| 2020/0068430 A1* | 2/2020 | Chan | H04W 24/08 |
| 2020/0178093 A1* | 6/2020 | Peng | H04W 24/02 |
| 2020/0221346 A1* | 7/2020 | Park | H04L 41/5041 |
| 2020/0351717 A1* | 11/2020 | Bernstein | H04W 28/20 |
| 2021/0235316 A1* | 7/2021 | Huang | H04W 28/0289 |
| 2021/0235372 A1* | 7/2021 | Wang | H04W 28/0268 |
| 2022/0086669 A1* | 3/2022 | Yao | H04L 43/0876 |
| 2022/0086864 A1* | 3/2022 | Sabella | H04L 47/76 |

OTHER PUBLICATIONS

IEEE: Network Slicing and Softwarization: A Survey on Principles, Enabling Technologies, and Solutions; Ibrahim Afolabi, Tarik Taleb, Konstantinos Samdanis, Adlen Ksentini, and Hannu Flinck; (Year: 2018).*

Stockert, et al. "Management of Persistsent Network Slices By a Distributed Learning System in a 5G or Other Next Generation Wireless Network" U.S. Appl. No. 16/700,055, filed Dec. 2, 2019, 51 pages.

Stockert, et al., "Application Management of Network Slices With Ledgers" U.S. Appl. No. 16/519,633, filed Jul. 23, 2019, 51 pages.

Mhapsekar, et al. "Modifying Capacity Assigned to Support a Network Slice Allocated to a User Device in a 5G or Other Next Generation Wireless Network." U.S. Appl. No. 16/804,472, filed Feb. 28, 2020. 45 pages.

* cited by examiner

RECALIBRATING RESOURCE PROFILES FOR NETWORK SLICES IN A 5G OR OTHER NEXT GENERATION WIRELESS NETWORK

TECHNICAL FIELD

The subject application is related to the use of network slices in a 5G or other next generation wireless communication system, and, for example, managing resources assigned to network slices in a wireless network.

BACKGROUND

Fifth generation (5G) wireless communications can facilitate the abstraction of network services into network slices managed by the provider of the network. Considering the broad variety of devices that rely upon wireless communication, there is the potential for millions or billions of 5G network slices to be allocated to different types of devices. Given the scale and complexity of network slice utilization, allocating, maintaining, and managing network slices can be difficult.

One benefit that can result from the use of network slices is the allocation of network resources to support different types of network applications, e.g., high bandwidth, low-latency, and systems optimized to support the Internet of things (IoT). Problems can occur however when the allocating of resources to a network slice for a type of application does not satisfy the performance requirements of the application.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
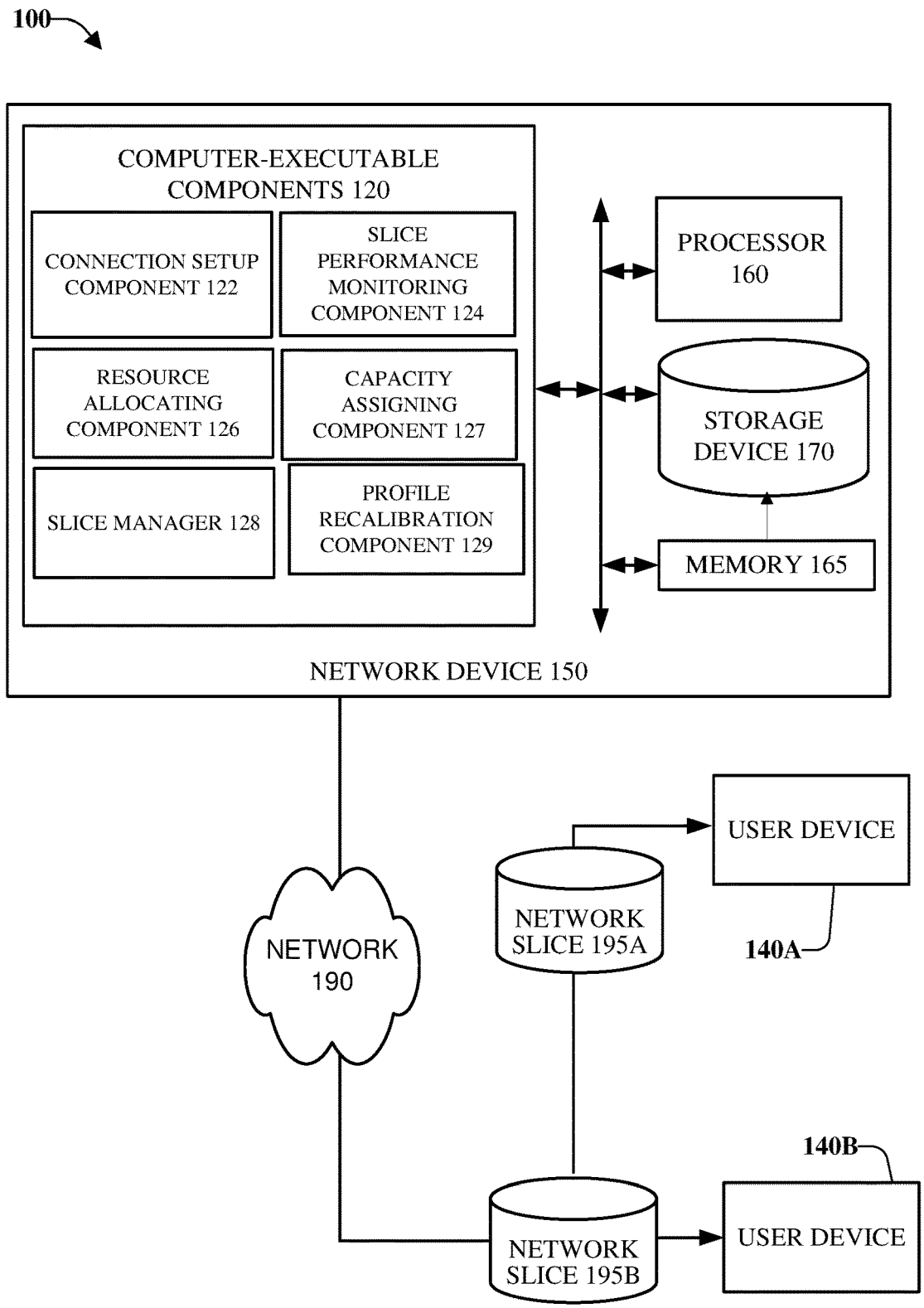
FIG. 1 is an architecture diagram of an example non-limiting system that can facilitate recalibrating resource profiles assigned to network slices, in accordance with one or more embodiments.

Generally speaking, one or more embodiments described herein can facilitate modifying capacity assigned to support network slices allocated to a user devices, using different approaches. In addition, one or more embodiments described herein can be directed towards a multi-connectivity framework that supports the operation of New Radio (NR, sometimes referred to as 5G). As will be understood, one or more embodiments can allow an integration of user devices with network assistance, by supporting control and mobility functionality on cellular links (e.g. long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS).

In some embodiments the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g. LTE.

Generally speaking, in one or more embodiments, a network device can provide network slicing with elements to support different types of services and requirements. The network slicing can also be termed virtual networking, and can provide virtual components that can distribute functionality for facilitating services to devices across the network, e.g., supporting multiple virtual networks behind interfaces of a communication network. The slicing of the network into multiple virtual networks can provide support for different Radio Access Networks (RAN) and different service types running across a single RAN. As discussed below, in one or more embodiments, flexible distribution of the access, edge, and core elements of the network cloud can provide support for latency and service isolation for different apps and service requirements.

FIG. 1 is an architecture diagram of an example system 100 that can facilitate recalibrating resource profiles assigned to network slices, in accordance with one or more embodiments. For purposes of brevity, description of like elements and/or processes employed in other embodiments is omitted.

System 100 can include network device 150 communicatively coupled to user devices 140A-B via network 190. Network slices 195A-B are allocated to user devices 140A-B. According to multiple embodiments, network device 150 can include memory 165 that can store one or more computer and/or machine readable, writable, and/or executable components 120 and/or instructions that, when executed by processor 160, can facilitate performance of operations defined by the executable component(s) and/or instruction (s).

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In an example, memory 165 can store computer and/or machine readable, writable, and/or executable components 120 and/or instructions that, when executed by processor 160, can facilitate execution of the various functions described herein relating to network device 150, e.g., connection setup component 122, slice performance monitoring component 124, resource allocating component 126, slice manager 128, capacity assigning component 127, profile recalibrating component, as well as other components to implement and provide functions to support system 100 and some other embodiments described herein.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

In one or more embodiments, memory 165 can store executable instructions that, when executed by processor 160, facilitate generation of slice manager 128, which can allocate network slices 195A-B to user devices 140A-B, respectively. To enable the assigning of resources to network slices 195A-B depicted in FIG. 1, using different approaches described below, one or more embodiments of slice manager 128 can utilize connection setup component 122 to facilitate setting initial configurations of resources for network slices 195A-B.

In one or more embodiments, memory 165 can additionally store executable instructions that, when executed by processor 160, facilitate generation of connection setup component 122. In one or more embodiments, slice connection setup component 122 can receive a request received from user device 140A to establish a connection utilizing network slice 195A. In some implementations, this request can be of a particular type, e.g., a request for a certain level of slice capabilities, e.g., an allocation of resources to support the purposes for which the connection is established, such as for remote medical devices, IoT devices, and remotely controlled vehicles. In one or more embodiments, memory 165 can additionally store executable instructions that, when executed by processor 160, facilitate generation of resource allocating component 126. In one or more embodiments, resource allocating component 126 can allocate resources to network slices based on factors that can include, but are not limited to, the type of request, noted above, services contracts (e.g., also termed service level agreements (SLAs), and, as described further herein, service resource profiles (e.g., also termed network slice specific service resource profiles), which can broadly control the dynamic allocation of resources to network slices 195A-B for particular applications.

When providing network slices 195A-B to user devices 140A-B, one or more embodiments can assign capacity to support the reliable operation of network slices. As discussed further with FIG. 4 below, capacity for different resources can be assigned at different parts of system 100, including, but not limited to, backhaul resource capacity, resource capacity of edge network devices (also termed fronthaul capacity), assignment of network buffers, queueing priority relative to other network slices, latency, interface bandwidth, and base station resources (also termed RRU or access capacity). In one or more embodiments, base station resources can include a radio frequency block for connection to the network slice via a connection to the base station. Further, in one or more embodiments, resource capacity can apply to load balancing, e.g., over front-haul and other types of interface connections.

In some implementations, resource capacity represents an excess of resources available to provide to network slices, e.g., an amount of resources set aside for network slices 195A-B. Resources that can be allocated by resource allocating component 126 to network slices 195A-B, include any of the various examples discussed above. Example applications and associated resource allocations are discussed further with FIG. 2 below.

In some implementations, network slices 195A-B can be allocated to user devices 140A-B based on different factors, including, but not limited to, uses to which the slice is to be utilized, characteristics of the user device, and the total availability of resources. As is discussed further below, with FIG. 3, capacity profiles can be used as models of capacity assigning to network slices 195A-B for different activities and purposes. Further, as discussed with FIGS. 3-6 below, one or more embodiments can modify the operation of user devices, and modify assigned capacity for slices allocated to these devices, based monitoring the performance of different system components, including, but not limited to, the performance of network slices 195A-B.

In one or more embodiments, memory 165 can store executable instructions that, when executed by processor 160, facilitate generation of slice performance monitoring component 124. In one or more embodiments, slice performance monitoring component 124 can monitor performance of the network slice when performing operations, resulting in monitored performance of the network slice. Based on this monitored performance, in one or more embodiments, profile recalibration component 129 can adjust the settings of a resource profile for a service type applied to network slice 195A. In one or more embodiments, adjustments can be selected so as to increase the performance of network slice 195A in accordance with a performance requirement of the network service type. One way of adjusting the resources allocated to user device 140A is to modify (e.g., also termed recalibrate) the service resource profile (e.g., selected upon connection setup) that can control the ongoing allocation of resources to user device 140A. Examples of the application of service resource profiles are discussed further with FIG. 3 below.

For example, in one or more embodiments, when a latency measure of communications for network slice 195A falls below a low-latency threshold, a resource profile for a low-latency service type can be recalibrated, with slices that utilize this profile having resources dynamically changed in accordance with the profile change.

Figure 2:
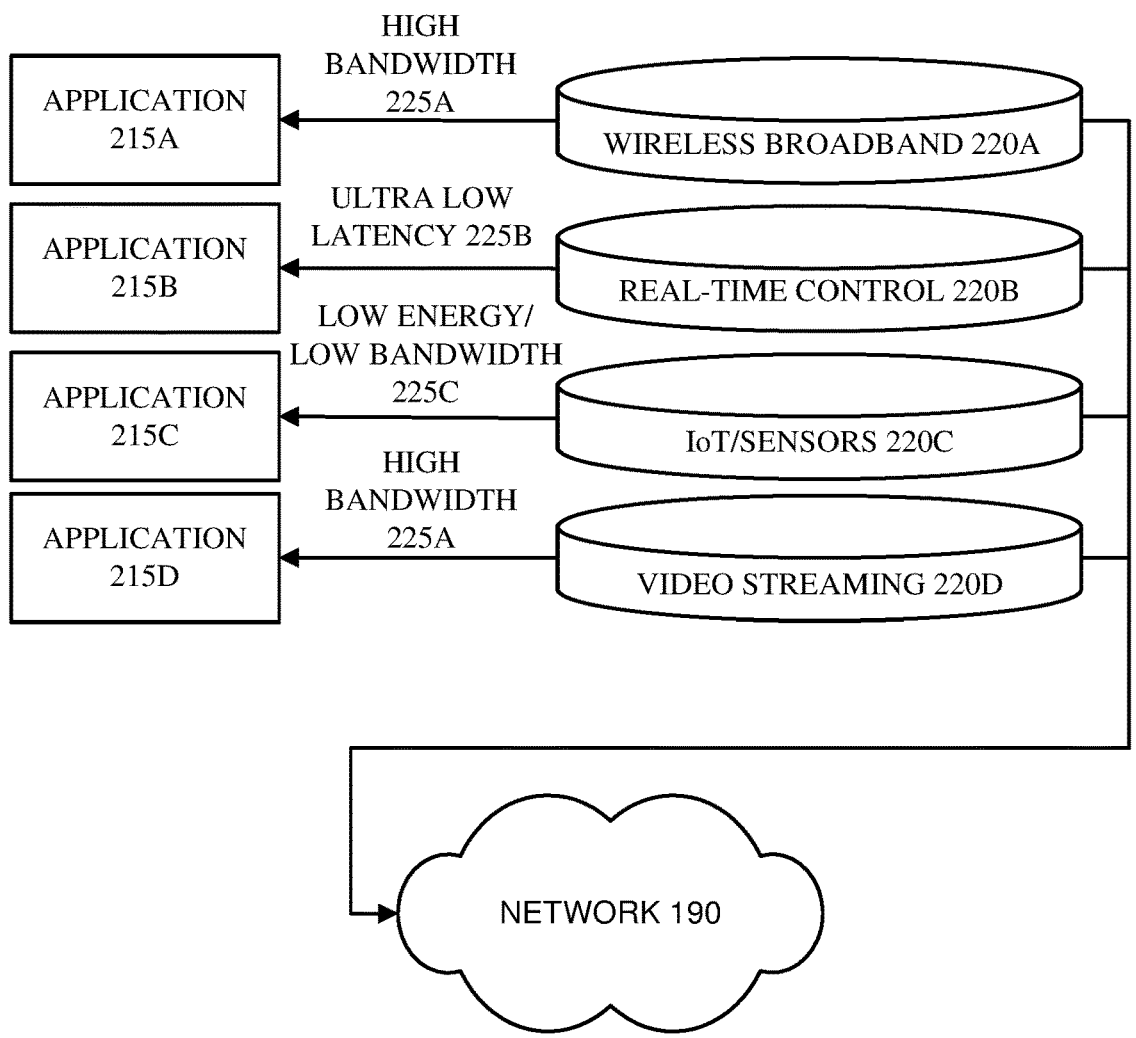
FIG. 2 illustrates an example non-limiting system of network slices allocated to applications of one or more user devices, in accordance with one or more embodiments.

FIG. 2 illustrates an example system 200 of network slices 220A-D allocated to applications 215A-D of one or more user devices 140A-B, in accordance with one or more embodiments. For purposes of brevity, description of like elements and/or processes employed in other embodiments is omitted.

In one or more embodiments, network slices can describe virtual networks with independent sets of logical network functions that can be selected to support particular requirements of different network applications 215A-D of user devices 140A-B. Resources allocated to network slices can be assigned based on approaches including, but not limited to, characteristics of the user device, requirements of applications 215A-D, and available resources. In addition, applications, as a part of execution, can request allocation of a network slice having certain characteristics to facilitate successful program execution.

Example characteristics of network slices can include, but are not limited to, location, speed, connectivity, latency, security, energy use, coverage, and capacity. Example network slices 220A-D, configured with certain characteristics for certain applications, are discussed below. As described further with FIG. 3, one approach to assigning capacity for network slices 220A-D is to use slice capacity profiles to group resource values to provide the resources and network topology for the specific service and traffic required by applications 215A-D, with these applications using resources of respective network slices. Different characteristics of network slices noted above, and throughout the present disclosure, can be modified to meet the particular demands of each use case.

In an example, application 215A can require high-bandwidth 225A to facilitate wireless broadband network slice 220A. An example of application 215A can be a web browser that requires wireless broadband network slice 220A to deliver web content. In another example, application 215D can require a high bandwidth 225A to facilitate high-quality mobile video streaming 220D. An example slice capacity profile that can provide aspects of these settings is the enhanced mobile broadband (eMBB) slice profile that can provide significantly faster data speeds and greater capacity for connectivity.

In another example, application 215B can require ultra-low latency 225B to facilitate real-time control 220B. As discussed further in examples below, in an example, application 215B can utilize real-time control 220B to control a flying drone, or provide support for devices that enable remote medical care, procedures, and treatment. An example slice capacity profile that can provide aspects of these settings is the ultra-reliable low-latency communications (uRLLC) slice profile.

In another example, application 215C can utilize a low energy/low bandwidth 225C to facilitate efficient control of IoT sensors 220C. Specific approaches described further herein can also facilitate developing 5G IoT capabilities to discover and adhere to slice-defined limitations. An example slice capacity profile that can provide aspects of these settings is the massive machine to machine communications (mMTC) slice profile. One having skill in the relevant art(s), given the description herein, will appreciate that the above descriptions of applications and slice profiles that can utilize one or more embodiments is non-limiting, and other applications can be allocated combinations of resource characteristics to support different functions.

In one or more embodiments, capacity assigning component 127 can perform operations that include, based on the monitored usage of network slices 195A-B, facilitating modifying the capacity of the resource assigned to support network slice 195A-B in accordance with a guideline for assigning the capacity of the resource of the network, e.g., slice profiles 225A-C. Further, capacity assigning component 127 can facilitate modifying the capacity of the resource assigned to support network slice 195A-B in accordance with a service level agreement.

Figure 3:
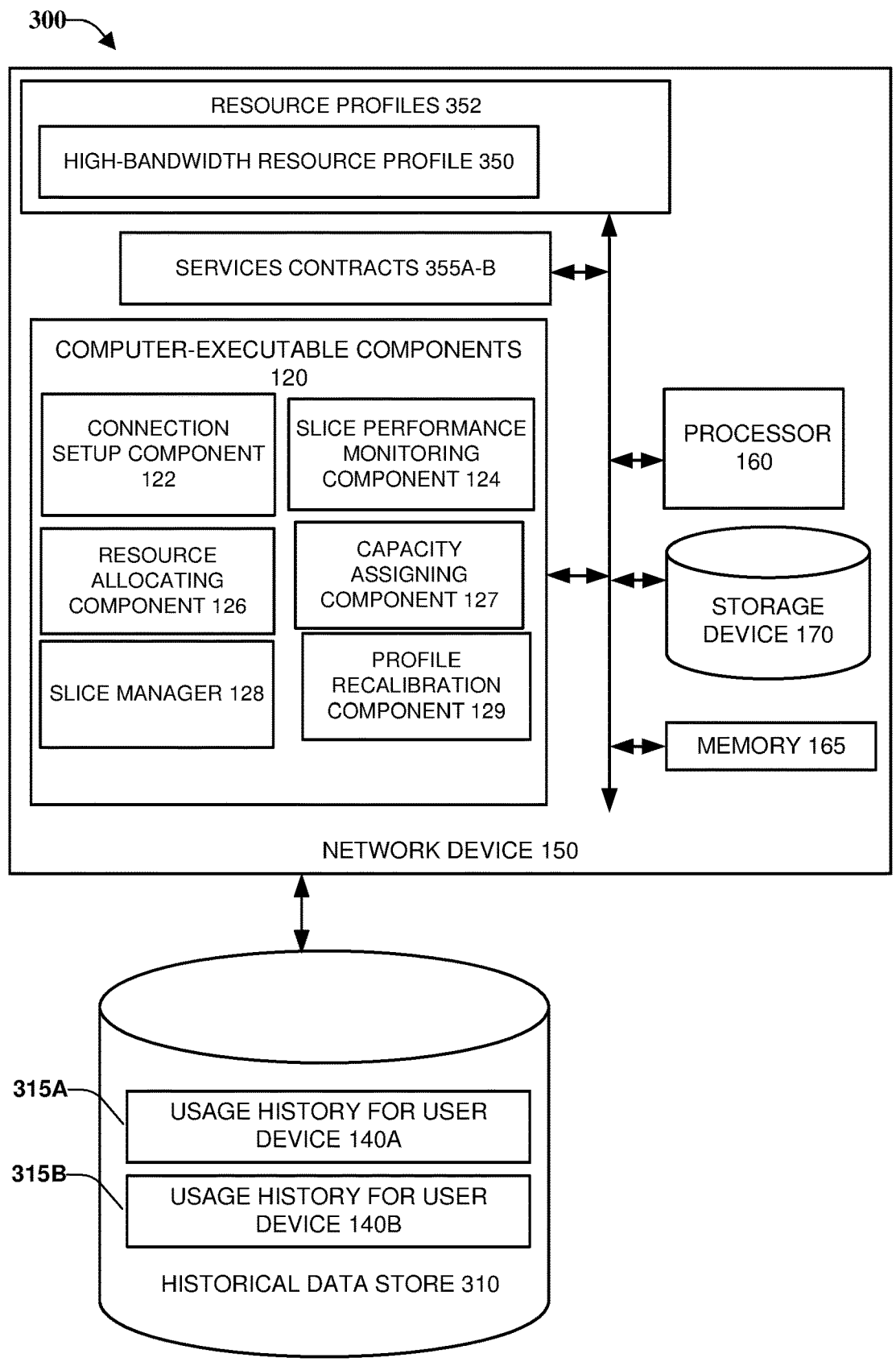
FIG. 3 illustrates a system that can use a network device to facilitate recalibrating resource profiles assigned to network slices, in accordance with one or more embodiments.

FIG. 3 illustrates a system 300 that can use network device 150 to facilitate recalibrating resource profiles assigned to network slices, in accordance with one or more embodiments. For purposes of brevity, description of like elements and/or processes employed in other embodiments is omitted. System 300 can include network device 150 communicatively coupled to historical data store 310. As depicted in FIG. 3, network device 150 can further include slice capacity profiles 352, and service level agreements 355A-B. As depicted, computer-executable components 120 can further include usage pattern identifier 360 and capacity prediction component 360.

In one or more embodiments, the modifying the characteristics of a resource profile by profile recalibration component 129 can be further based on historical information associated with user devices 140A-B stored in a data store. As used herein, data associated with the network devices can be broadly interpreted, including, but not limited to, usage data of user device 140A, for which the capacity was initially set, usage data for an example user device 140B, a device similar to user device 140A, e.g., having the same characteristics, being used in a similar fashion, being used by same type of user, e.g., users that have similar tasks to perform with user devices 140A-B, such as a first responder, or an IoT device. Thus, in one or more embodiments, the historical information utilized by resource allocating component 126 can include historical information regarding usage of user devices determined to be similar to the user device based on a defined similarity criterion.

Additional factors that can affect changes to the capacity assigned to a network slice is a service level agreement for the slice, often to set guidelines for maintaining the levels of service specified by the profiles 225A-C. For example, from the discussion of FIG. 2, with application 215A requiring high-bandwidth 225A (e.g., eMBB profile) to facilitate wireless broadband network slice 220A for a high bandwidth 225A application to facilitate video streaming can use SLA 355A to establish guidelines to maintain an excess capacity for the bandwidth resource of the network slice.

Usage data, as used to describe some embodiments herein, can broadly include, but is not limited to, bandwidth utilization by slices allocated to monitored devices and other utilization measures that can affect predictions as to future utilization of the network slice, these predictions being discussed further with FIG. 6 below. In one or more embodiments, historical information utilized by resource allocating component 126 can comprise historical information regarding usage of the user device. In one or more embodiments, approaches to data collection and analysis can result in predictions (e.g., projections) that can used to modify capacity assigning for network slices before any service degradation for the network slice occurs.

Figure 4:
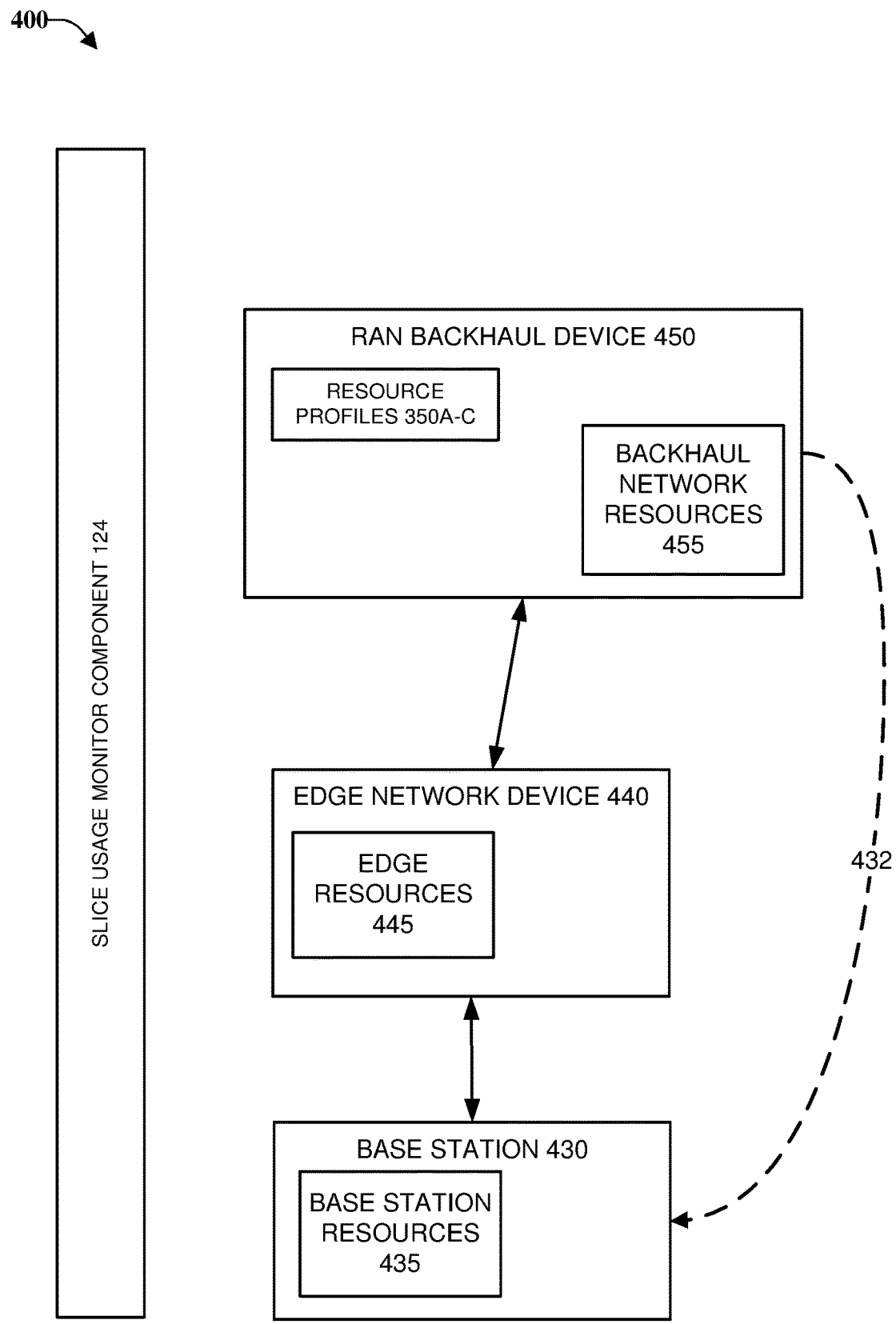
FIG. 4 depicts a diagram that illustrates an example non-limiting system that can facilitate modifying profiles that specify resources for network slices, in accordance with one or more embodiments.

FIG. 4 depicts a diagram that illustrates an example system 400 that can facilitate modifying profiles that specify resources for network slices, in accordance with one or more embodiments. For purposes of brevity, description of like elements and/or processes employed in other embodiments is omitted. System 400 can comprise base station 430, edge network device 440, and RAN backhaul device 450. Base station 430 includes base station resources 435 and edge network device 440 includes edge resources 445. In one or more embodiments, base station can receive signals from RAN backhaul device 450 via edge network device 440 and can serve the connectivity to multiple user devices 140A-B in a RAN. RAN backhaul device 450 includes resource profiles 350A-C and backhaul network resources 455, in accordance with one or more embodiments. It should be noted that the elements of network device 150 can be used at one or more levels of RAN 400, e.g., to advantageously distribute and replicate the monitoring of slice utilization data 495, evaluation of usage data (e.g., by capacity prediction component analyzing real time data store 490, and modifying capacity assigning of resources based on usage data, for the different levels.

In one or more embodiments, RAN backhaul device 450 can be a core network device that facilitates communications with internet devices, e.g., other devices connected via the internet. RAN backhaul device Edge network device 440 can facilitate communication with base station 430 (RRU), via a fronthaul connection, with communications from RAN backhaul device 450 being via a backhaul connection. As noted above, network slices 195A-B can be termed virtual networks, and with this implementation, a virtual network can span from a user device communicatively coupled to base station 430, to the internet device, via the edge network device 440 and the RAN backhaul device 450.

As illustrated in FIG. 4, one or more embodiments can monitor the performance of network slices at multiple levels of a RAN, with each level having different processing tasks, communications, and resources. As noted above, example characteristics of network slices that can be monitored can include, but are not limited to, location, speed, connectivity, latency, security, energy use, coverage, and capacity. Example network slices 220A-D can be configured with certain characteristics for network service types, e.g., to support certain applications. In one or more embodiments, the virtual isolation of network slices from other parts of the system can be beneficially used both for monitoring use (e.g., performance) of the network slices, and for modifying the configurations of, and resources available to, network slices.

For example, application 215A discussed above can require high-bandwidth 225A to facilitate wireless broadband network slice 220A, with an example of application 215A being a web browser that requires wireless broadband network slice 220A to deliver streaming video content. In one or more embodiments, an example resource profile that can be used by capacity assigning component 127 to provide aspects of these settings is the enhanced mobile broadband (eMBB) high-bandwidth resource profile 350, of profiles 352.

After a request by user device 140A executing application 215A, connection setup component 122 can apply high-bandwidth resource profile 350 to network slice 195A, capacity assigning component 127 can assign capacity, e.g., a larger than average capacity for bandwidth. In one or more embodiments, the assigned capacity represents the maximum bandwidth resources available to network slice 195A. As noted above with FIG. 3, network slice 195A, with the high-bandwidth resource profile 350, can have a services contract 355A-B applied, that can specify in some circumstances, guidelines (e.g., mandatory or not) for a minimum level of a resource that should be available to a network slice (e.g., the capacity of bandwidth assigned to the network slice), and a minimum level of performance that should be provided by the network slice, e.g., a minimum level of throughput.

It should be noted that, a variety of different resource and performance metrics can be used, by one or more embodiments, measured at different parts of the operation of network slice 195A. For example, in one or more embodiments, to measure performance that is directly relevant to the operation of network slice 195A on the operation of application 215A, measured performance metrics can comprise video frames dropped and maximum bitrate of the video stream.

Continuing this example, to facilitate the providing of services by network slice 195 according to the high-bandwidth resource profile 350, one or more embodiments can use the results of the monitoring discussed above to dynamically change aspects of network slice 195A that can include, but are not limited to, backhaul network resources 455, edge network resources 445, and base station resources 435. Examples of aspects that can be changes can comprise, bandwidth capacity (e.g., noted above as assigned for network slice 195A at the time of setup), processing power allocated for stream processing at both RAN backhaul device 450 and edge network device 440. Aspects can also flexibly include aspects of network operation, such as routing choice, e.g., instead of connecting to base station 430 via edge network 440 an alternative route to base station 430 through another edge resource (not shown) can be selected. In additional embodiments, different available base stations (not shown) can be selected, e.g., using the flexible base station connection rules of an example fifth generation wireless network system.

In this example, raising the assign of bandwidth capacity to network slice 195A can be used to recalibrate the configuration of high-bandwidth resource profile 350, which can result in a dynamic modification of aspects of network slices to which this profile has been applied, e.g., network slice 195A. In one or more embodiments, as discussed with FIG. 5 below, resources profiles can be applied to multiple network slices, and the operation of all of these network slices can be affected by this resource profile change.

Figure 5:
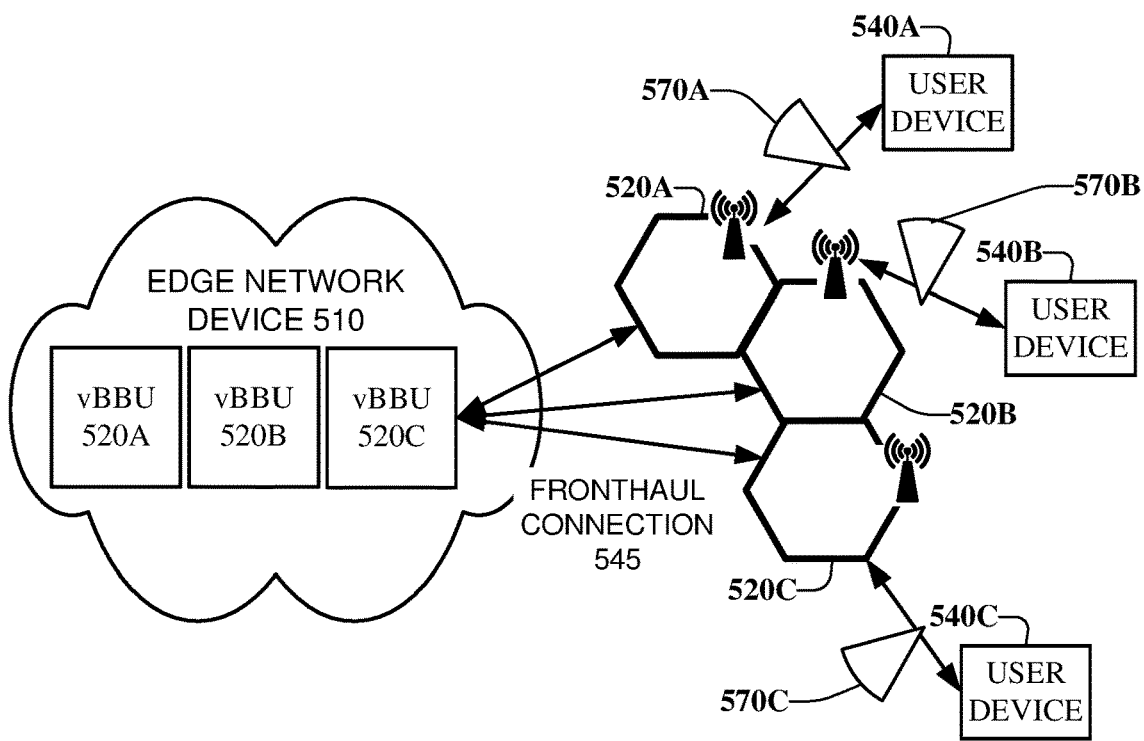
FIGS. 5-6 depict a non-limiting, example non-limiting systems that can facilitate the recalibration of resource profiles for resource allocation in network slices, in accordance with one or more embodiments.
Figure 6:
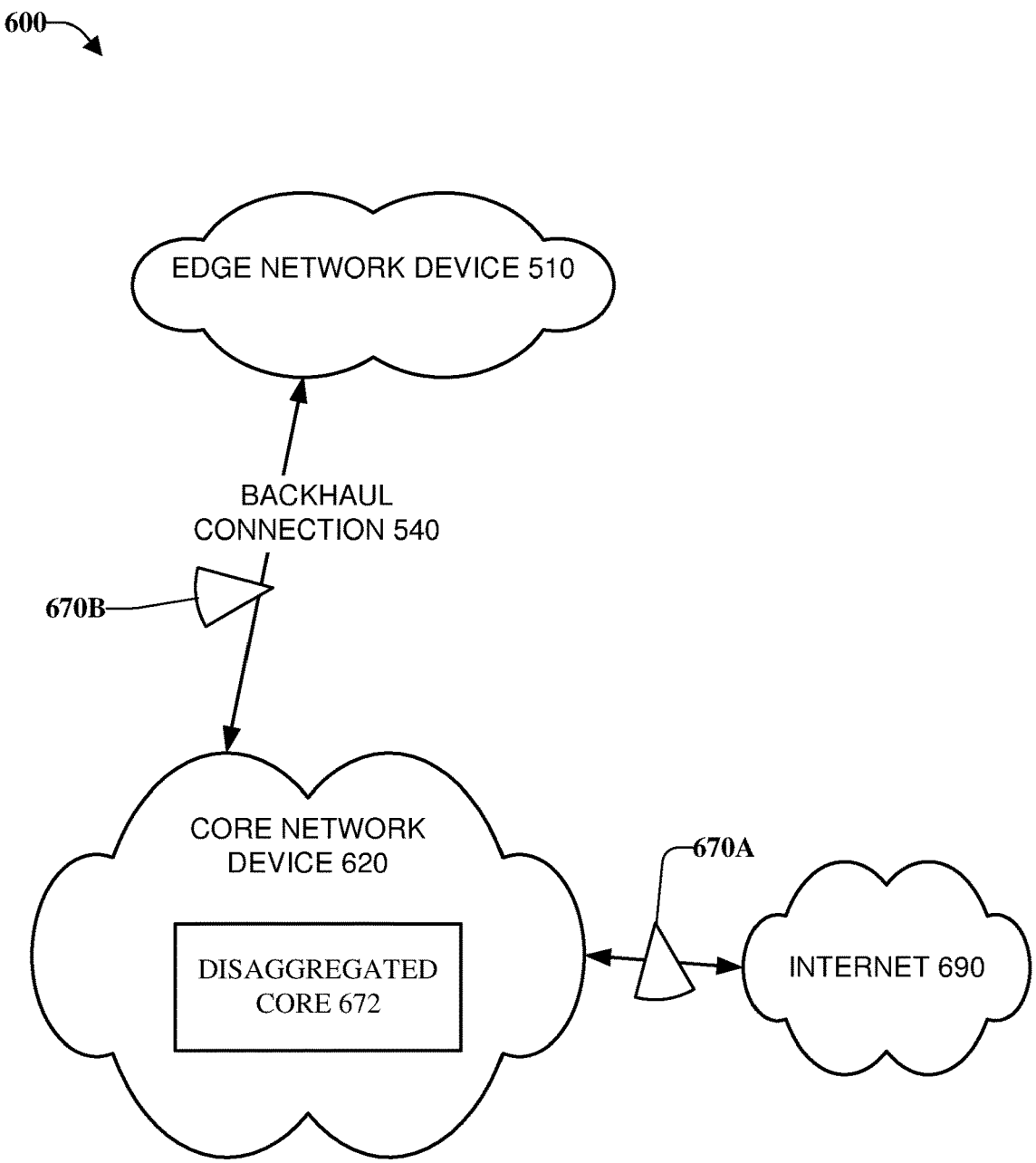

FIGS. 5-6 depict a non-limiting, example systems 500 and 600 that can facilitate the recalibration of resource profiles for resource allocation in network slices, in accordance with one or more embodiments. Repetitive description of like elements and/or processes employed in respective embodiments is omitted for sake of brevity. System 500 includes edge network device 510, and RRUs 520A-C wirelessly coupled to user devices 540A-C. Edge network device 510 is coupled to RRUs 520A-C via fronthaul connection 545. Each of user devices 540A-C has been assigned use 570A-C of network slices 572A-C. Edge network device 510 hosts virtual base band unit (vBBU) instances 560A-C.

As used herein, the term edge computing can refer to placement of processing and storage capabilities near the perimeter (e.g., the edge) of a provider's network. Edge computing can be contrasted with the highly-centralized computing resources, performing processing and storage in a central location, and serving out results. Using edge computing approaches to implement parts of a provider network can result in benefits that can include, but are not limited to, reducing backhaul traffic by storing content proximate to consumers, maintaining Quality of Experience (QoS) to user devices, improving the reliability of the network by distributing content and processing between edge and centralized datacenters.

Network slices can be implemented within decentralized edge computing environments by utilizing virtual processing, storage, and communication components to implement network slices, with virtualization management of resources allocated to network slices at different parts of the network. For example, as depicted in FIG. 5 each of user devices 540A-C respectively use 570A-C network slices 572A-C shown at edge network device 510.

In an alternative embodiments, a single slice 272A can have shared use 570A-C by user devices 540A-C. In this example, slice 272A can have high-bandwidth resource profile 350 assigned, and this profile can affect the allocation of resources to the operation of the network slice. In contrast to some other examples herein, when monitoring of network slice operation occurs, the monitoring is of the use by user devices 540A-C, not just user device 540A as with some other examples described herein. In some circumstances (e.g., when user devices 540A-C have similar utilization of the network slice) this can reduce the overhead expended per device to change the resources allocated to user devices 540A-C.

System 600 can include core network device 620 coupled to internet 690 and edge network device 510, by backhaul connection 540. Slices 572A-C discussed above are allocated resource in core network device 620, and these slices can access edge could 510 and internet 590 by connections 670A-B respectively. Core network device 620 can include disaggregated core 672. In one or more embodiments, disaggregated core 672 can represent the virtualization of different core functions for use with network slices 572A-C. For example, in one or more embodiments, core functions that can be virtualized include, but are not limited to, user plane functions, session management functions, unified data management, and authentication functions. As with the implementation of edge network device 510 described above, network slices can access virtualized resources in core network device 620 to provide services specific to application requirements.

Figure 7:
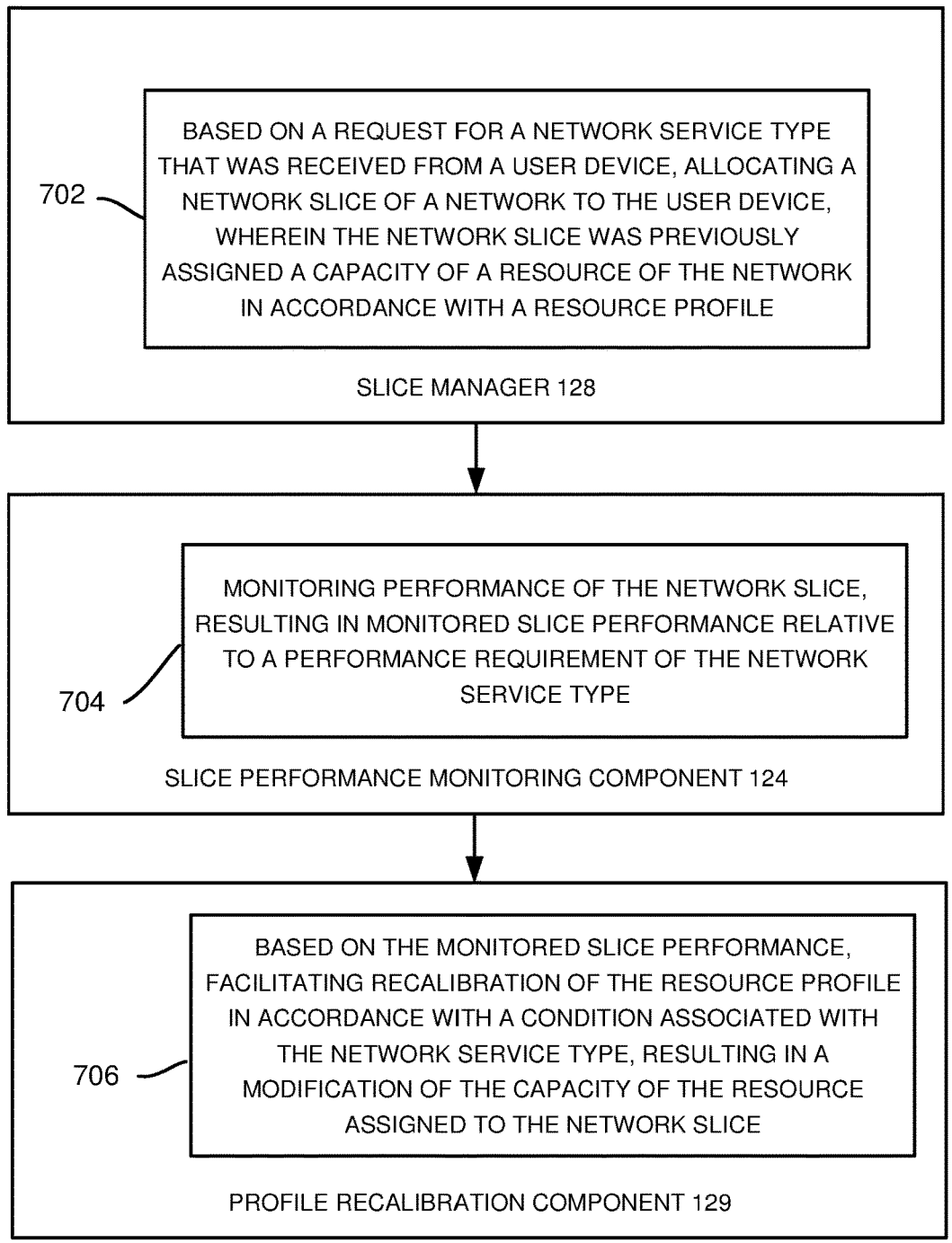
FIG. 7 illustrates an implementation of an example, non-limiting system that can comprise a slice manager, a slice performance monitoring component, a profile recalibration component, as well as other components to implement and provide functions to support the depicted system, in accordance with one or more embodiments described herein.

FIG. 7 illustrates an implementation of an example, non-limiting system 700 that can comprise slice manager 128, slice performance monitoring component 124, profile recalibration component 129, as well as other components to implement and provide functions to support system 700, in accordance with one or more embodiments described herein. Repetitive description of like elements and/or processes employed in respective embodiments is omitted for sake of brevity.

Slice manager 128 can be configured 702 to, based on a request for a network service type that was received from a user device, facilitate allocating a network slice of a network to the user device, wherein the network slice was previously assigned a capacity of a resource of the network in accordance with a resource profile. For example, in one or more embodiments, slice manager 128 can be configured 702 to, based on a request for a network service type (e.g., high bandwidth) that was received from user device 140A, facilitate allocating a network slice 195B of network 190 to user device 140A, wherein the network slice 195A was previously assigned a capacity of a resource of the network (e.g., by capacity assigning component 127) in accordance with high-bandwidth resource profile 350.

Slice performance monitoring component 124 can be configured 704 to facilitate monitoring performance of the network slice, resulting in monitored slice performance compared to the network service type. For example, in one or more embodiments, slice performance monitoring component 124 can be configured 704 to facilitate monitoring performance of the network slice 195A, resulting in monitored slice performance compared to the high-bandwidth network service type, as specified by high-bandwidth resource profile 350.

Profile recalibration component 129 can be configured 706 to, based on the monitored slice performance, facilitate recalibration of the resource profile in accordance with a condition of the network service type, resulting in a modification of the capacity of the resource assigned to the network slice. For example, in one or more embodiments, profile recalibration component 129 can be configured 706 to, based on the monitored slice performance, facilitate recalibration of high-bandwidth resource profile 350 in accordance with a condition of the high-bandwidth network service type (e.g., calibration of network resources that can improve bandwidth), resulting in a modification of the capacity of the resource assigned to the network slice (e.g., in accordance with the changes to resource profile 350.

Figure 8:
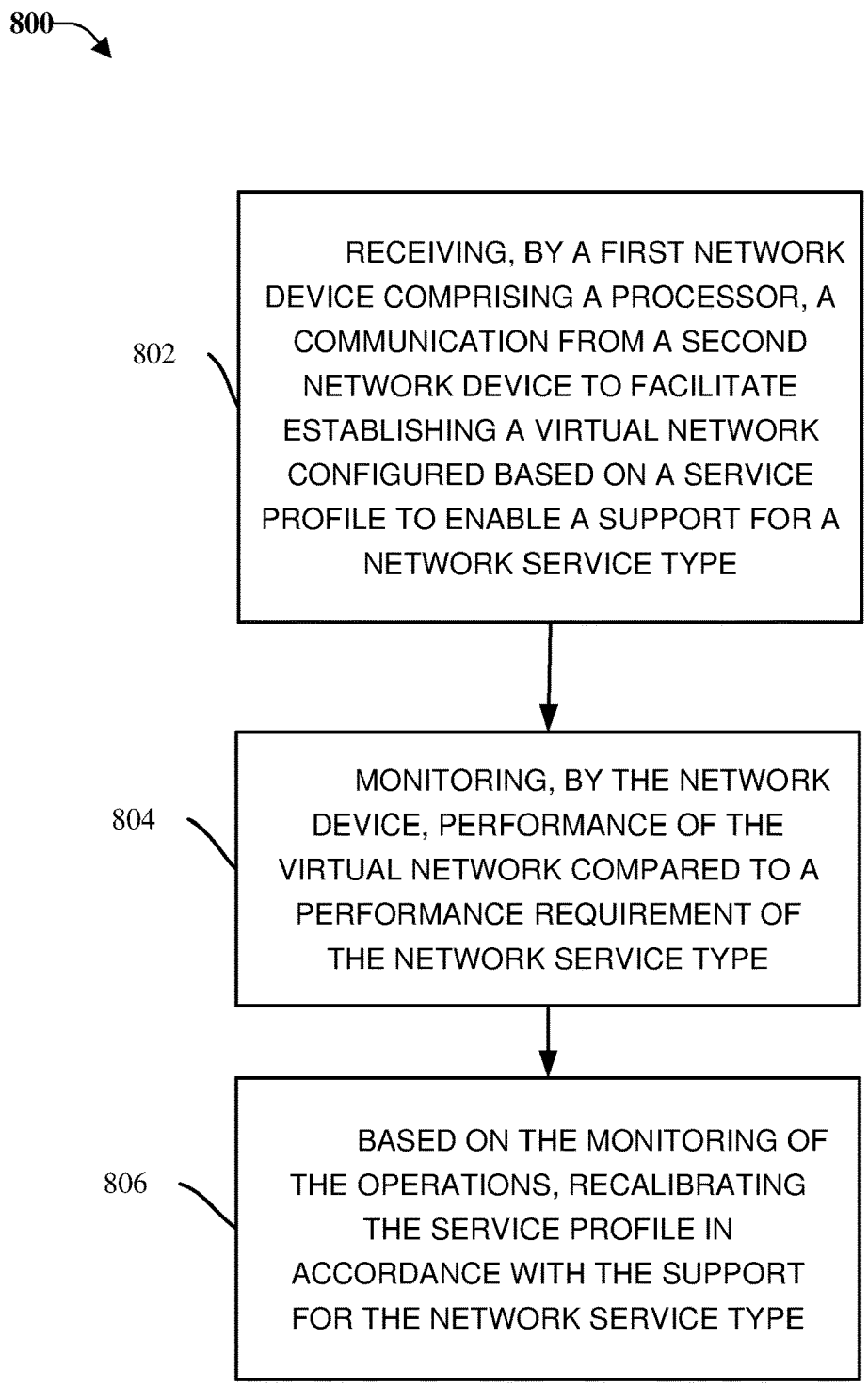
FIG. 8 illustrates a flow diagram of an example method that can facilitate the recalibration of resource profiles for resource allocation in network slices, in accordance with one or more embodiments.

FIG. 8 illustrates a flow diagram of an example method 800 that can facilitate the recalibration of resource profiles for resource allocation in network slices, in accordance with one or more embodiments. For purposes of brevity, description of like elements and/or processes employed in other embodiments is omitted.

At 802, method 800 can comprise receiving, by a first network device comprising a processor, a communication from a second network device to facilitate establishing a virtual network configured based on a service profile to enable a support for a network service type. For example, in one or more embodiments, method 800 can comprise receiving, by a first network device 150 comprising a processor 160, a communication from a second network device to facilitate establishing a virtual network (e.g., network slice 195A) configured based on a service profile to enable a support for a network service type. In one or more embodiments, virtual network utilized can include assigned capacities that include, but are not limited to, bandwidth, latency, energy consumption requirements for maintaining a connection, backhaul resource capacity, resource capacity of edge network devices, assignment of network buffers, relative queueing priorities, latency, interface bandwidth, RRU or access capacity, and radio frequency blocks for connection to the network slice via a connection to a base station.

At 804, method 800 can comprise monitoring, by the network device, performance of the virtual network relative to a performance requirement of the network service type. For example, in one or more embodiments, method 800 can comprise monitoring, by the network device, performance of the virtual network relative to a performance requirement of the network service type.

At 806, method 800 can comprise based on the monitoring of the operations, recalibrating the service profile in accordance with the support for the network service type. For example, in one or more embodiments, method 800 can comprise based on the monitoring of the operations, recalibrating the high-bandwidth service profile 350 in accordance with the support for the network service type.

It is to be appreciated that one or more embodiments described herein can utilize various combinations of electrical components, mechanical components, mass storage, circuitry, and extensive, repetitive, rapidly performed, and complicated analysis of data that cannot be replicated in the mind of a human or performed by any number of humans working together. One or more embodiments can provide a technical solution to a technical problem by processing and analyzing utilization data of network slices with functions beyond the capability of a human mind, e.g., the operations of network components including, but not limited to, slice performance monitoring component 124 and resource allocating component 126 cannot be performed by a human mind in the period of time required by one or more embodiments.

According to several embodiments, system 100 can also be fully operational towards performing one or more other functions (e.g., fully powered on, fully executed, etc.) while also performing the various operations of a RAN that are described and suggested herein. It should be appreciated that such simultaneous multi-operational execution is beyond the capability of a human mind. It should also be appreciated that system 100 can obtain, analyze, and process information that is impossible to obtain, analyze, and process manually by an entity, such as a human user. For example, the type, amount, and/or variety of information included in system 100 disclosed herein, can be more complex than information able to be obtained manually by a human user.

Figure 9:
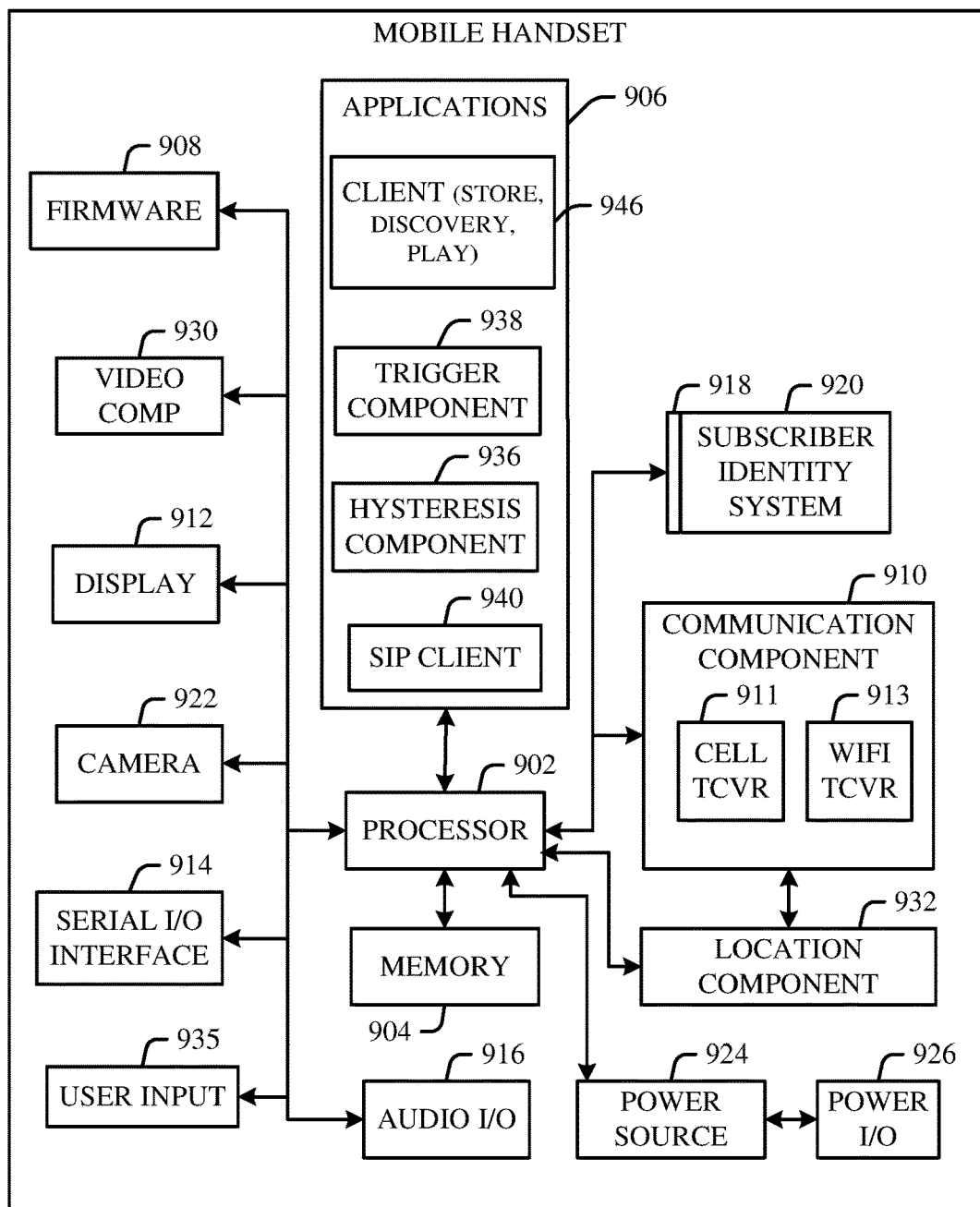
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

As discussed with FIG. 1, network 190 can include a wireless communication system, and thus can include one or more communication service provider networks that facilitate providing wireless communication services to various user equipments included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device 150 can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

Network 190 can employ various cellular systems, technologies, and modulation schemes to facilitate wireless radio communications between devices (e.g., user devices 140A-B and network device 150). While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the user devices 140A-B and the network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
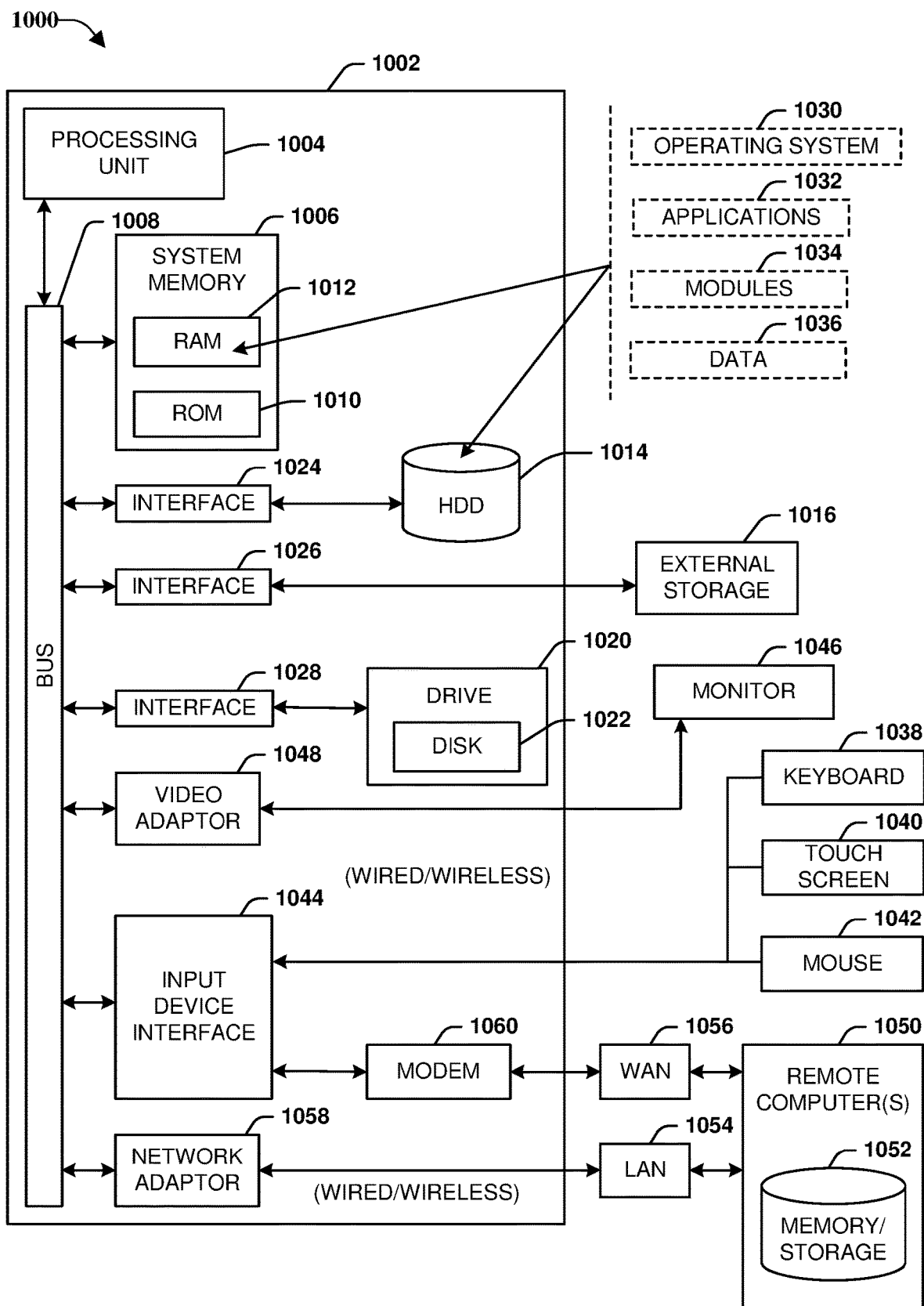
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. Core network equipment, comprising:
 a processor; and
 a memory that stores executable instructions that, when executed by the processor, facilitate performance of operations, comprising:
  based on a request for a network service type that was received from a user device, allocating a network slice of a network to the user device, wherein the network slice was previously assigned to the user device with a capacity of a resource of the network in accordance with a resource profile for the user device, and wherein the resource profile controls allocation of resources to the network slice;
  monitoring performance of the network slice, resulting in monitored slice performance by the core network equipment, compared to a performance requirement of the network service type; and
  based on the monitored slice performance and a prediction of future utilization of the network slice, facilitating recalibration of the resource profile in accordance with a condition associated with the network service type, resulting in a modification of the capacity of the resource assigned to the network slice, wherein the resource profile further controls recalibration of the allocation of resources to the network slice to maintain adherence to the performance requirement, wherein the network slice comprises a virtual network that spans from the user device, to the core network equipment, wherein the prediction of future utilization is based on historical information regarding usage of the user device, wherein the resource comprises a group of resources, the group of resources comprising first resources of a backhaul network device, second resources of a fronthaul network device, and third resources for load balancing of the network slice across multiple connections.

2. The core network equipment of claim 1, wherein the recalibration of the resource profile further results in modifications, corresponding to the modification, to the capacity of the resource assigned to other network slices to which the resource profile was assigned.

3. The core network equipment of claim 1, wherein the facilitating of the recalibration is further based on a services contract, and wherein the services contract is selected to control access by the network slice to the resource assigned to the network slice.

4. The core network equipment of claim 1, wherein the resource further comprises a prioritization resource to prioritize communications of the network in relation to other network slices other than the network slice.

5. The core network equipment of claim 1, wherein the resource comprises a radio frequency block for connection to the network slice via a connection to a remote radio component.

6. The core network equipment of claim 5, wherein the radio frequency block comprises a radio frequency block applicable to a fifth generation radio access network.

7. The core network equipment of claim 1, wherein the allocating of the resources to the network slice in accordance with the resource profile is performed during call setup processing.

8. The core network equipment of claim 1, wherein the group of resources further comprises bandwidth resources allocated to the network slice.

9. A method, comprising:
 receiving, by a core network device comprising a processor, a communication from an edge network device to facilitate establishing a virtual network for a user equipment configured based on a service profile of the user equipment, wherein the service profile controls allocation of services to a network slice to allocate a level of services to support a network service type to be provided to the user equipment;
 monitoring, by the core network device, performance of the virtual network relative to a performance requirement of the network service type;
 based on the monitoring of the performance and a prediction of future utilization of the network slice, determining that the virtual network requires a different level of services to maintain the performance requirement, wherein the prediction of future utilization is based on historical information regarding usage of the user equipment; and
 recalibrating the service profile in accordance with maintenance of the performance requirement, wherein the network slice comprises the virtual network that spans from the user equipment to the core network device, wherein the usage of the user equipment comprises usage of resources comprising first resources of a backhaul network device, second resources of a fronthaul network device, and third resources usable to load balance the network slice across multiple connections.

10. The method of claim 9, wherein the recalibrating of the service profile comprises recalibrating the service profile in accordance with a result of the monitoring the performance of the virtual network and the performance requirement of the network service type.

11. The method of claim 10, wherein the performance requirement comprises the performance requirement to facilitate the virtual network enabling an enhanced mobile broadband network.

12. The method of claim 10, wherein the performance requirement comprises the performance requirement to facilitate an ultra-reliable low latency communications network.

13. The method of claim 10, wherein the performance requirement comprises the performance requirement to facilitate a massive machine to machine communications profile applied to the virtual network.

14. The method of claim 9, wherein the user equipment is connected to the core network device via the edge network device.

15. A non-transitory machine-readable medium, comprising executable instructions that, when executed by a processor of a network device, facilitate performance of operations, comprising:
 based on a request for a network service type that was received from a user device, allocating a network slice of a provider network to the user device, wherein the network slice was previously assigned to the user device with a capacity of a resource of the provider network in accordance with a resource profile specifying a service type, and wherein the resource profile controls allocation of network resources to the network slice for provision to the user device;
 monitoring performance of the network slice, resulting in monitored slice performance compared to a performance requirement of the network service type; and based on the monitored slice performance and a prediction of future utilization of the network slice, facilitating modification of the resource profile in accordance with a condition of the network service type, resulting in a modification of the capacity of the resource assigned to the network slice to maintain adherence to the performance requirement, wherein the network slice comprises a virtual network that spans from a user equipment connected to a radio unit, to a core network device, wherein the prediction of future utilization is based on historical information regarding usage of the user device, wherein the resource comprises resources from a group of resources, the group of resources comprising first resources of a backhaul network device, second resources of a fronthaul network device, and third resources for load balancing of the network slice across multiple connections.

16. The non-transitory machine-readable medium of claim 15, wherein the group of resources further comprise a fourth resource usable to prioritize communications of the provider network in relation to network slices different than the network slice.

17. The non-transitory machine-readable medium of claim 15, wherein the network slice comprises the virtual network that spans from the radio unit to a device employing an internet protocol for communications, via an edge network device and the core network device of the provider network.

18. The non-transitory machine-readable medium of claim 17, wherein the third resources comprise load balancing resources to balance communication between components in the virtual network.

19. The non-transitory machine-readable medium of claim 15, wherein the resource further comprises a radio frequency block for connection to the network slice via a connection to a remote radio component.

20. The non-transitory machine-readable medium of claim 15, wherein allocating of the network resources to the network slice in accordance with the resource profile is performed during call setup processing.

* * * * *